Patented Feb. 13, 1951

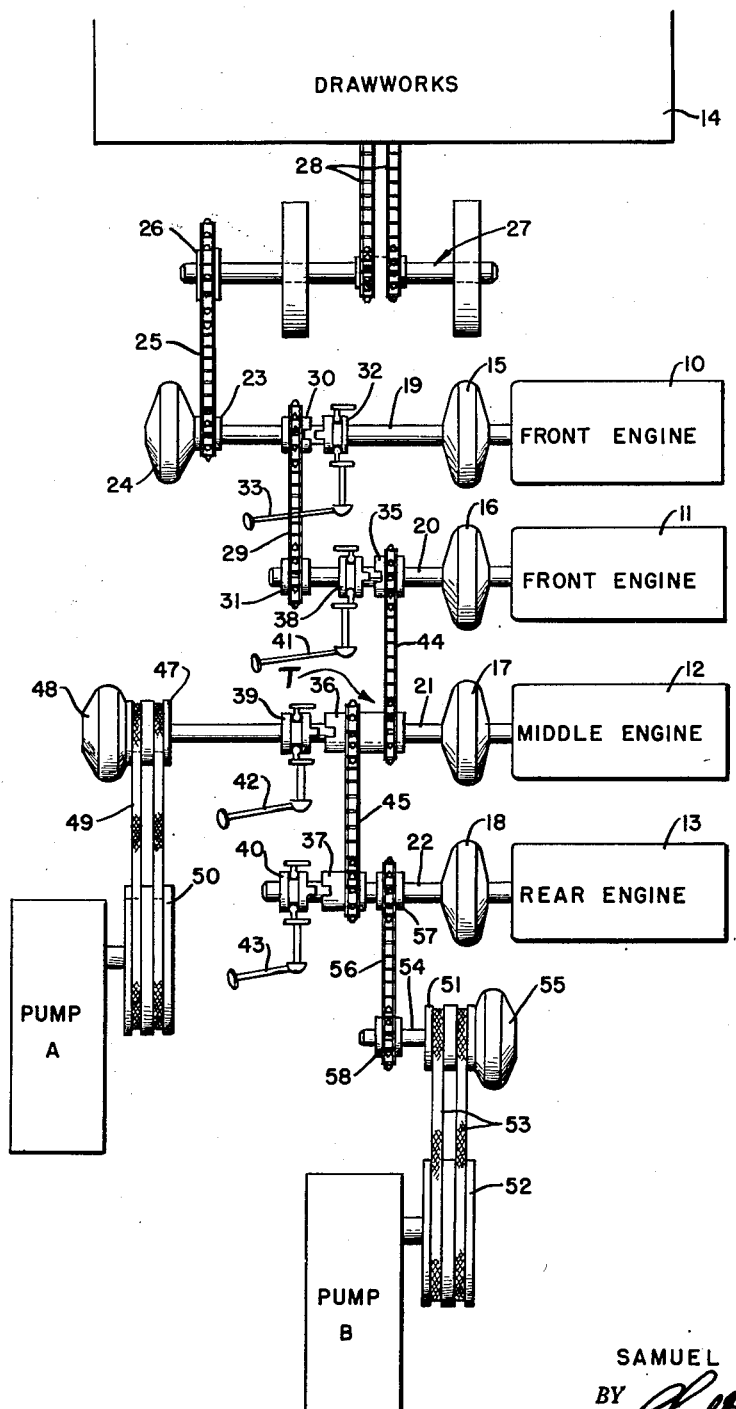

2,541,625

UNITED STATES PATENT OFFICE 2,541,625

ADJUSTABLE MULTIPLE ENGINE TRANSMISSION

Samuel W. Webster, Dallas, Tex., assignor to Emsco Derrick & Equipment Company, Los Angeles, Calif., a corporation of California Application January 27, 1947, Serial No. 724,621

8 Claims. (Cl. 74—665)

My invention relates to power means for operation of well drilling equipment, and relates in particular to a power device having a plurality of power sources, such as internal combustion engines, and a novel adjustable transmission for delivering the power to the drawworks and to other mechanisms such as drilling mud pumps and circulating or mixing pumps.

In modern drilling equipment different devices are employed requiring different amounts of power for the operation thereof. At times these devices may be operated singly or at other times a number of devices are operated simultaneously. For example, during drilling operations, the rotary table and the drilling mud pumps, and also the mud mixing pump, are operated simultaneously, each of these devices requiring a different amount of power. At other times the rotary machine may be stopped while the pumps are employed to circulate mud. It is an object of the invention to provide a power device having at least three engines and a novel transmission, whereby the power from these engines may be distributed in different amounts to the needed mechanisms in accordance with the power at the time required for the operation of the mechanisms.

It is an object of the invention to provide a drilling equipment for use in a derrick having a pair of pumps and means whereby either of these pumps may be driven for heavy duty by two drilling engines while the other pump is driven by a single engine for performance of a pumping operation requiring a smaller amount of power—for example, circulation of drilling mud through the mud reservoir so as to maintain the mud in thoroughly mixed condition.

It is an object of the invention to provide a power source for use in a well drilling derrick having at least one front engine, a middle engine, and a rear engine, and a simple and effective transmission means whereby the power of all of the engines may be delivered to the drawworks, and it is also an object of the invention to provide a transmission whereby power from any one of the engines may be transmitted to any of the driven devices. In the preferred practice of the invention, I provide a pair of front engines, a middle engine and a rear engine. Should there be a failure of any one of these engines, operations may be continued by use of power from one or more of the remaining engines.

Further objects and advantages of the invention will be brought out in the following part of the specification, wherein detailed description is employed for the purpose of disclosing a preferred form of the invention without limiting the scope thereof defined in the appended claims.

In the drawing which consists of a diagrammatic elevation of a preferred form of the invention, I have shown the various elements schematically since the invention consists not in the details of construction of the separate elements, which are old, but in the novel combination, whereby front engines 10 and 11, a middle engine 12, and a rear engine 13 may be employed to drive mechanisms such as a drawworks 14 and pumps A and B. Through clutches 15, 16, 17, and 18 the engines 10, 11, 12 and 13 may directly drive shafts 19, 20, 21 and 22. The clutches 15, 16, 17 and 18 are of the type adapted for the gradual application of power from the engines which are in operation to the shafts 19—22 which are connected to mechanisms which may be under load. Friction or hydraulic clutching devices are suited for this purpose.

A sprocket 23 is rotatable on the shaft 19 and may be connected to the shaft 19 by a clutch 24. The sprocket 23, through a chain 25, is adapted to drive the input sprocket 26 of a reversing gear mechanism 27, connected to the drawworks by chain and sprocket means 28. The shaft 19 is also connected, for power transmission, with the shaft 20 by a chain 29 and sprockets 30 and 31. One of these sprockets is fixed on the shaft with which it is associated and a clutch is provided for the other of the sprockets 30 and 31. I have shown the sprocket 30 rotatable on the shaft 19 and the sprocket 31 fixed on the shaft 20, with a clutch 32 for connecting the sprocket 30 to the shaft 19. This clutch 32 is of the intermeshing jaw type and is provided with an operating means 33 whereby it may be engaged with or disengaged from the sprocket 30. It will be perceived that when the clutches 15, 16, 24 and 32 are engaged, both of the front engines 10 and 11 may be employed to drive the drawworks 14.

For purpose of identification, the shafts 20, 21, and 22 may be respectively referred to as the front, middle and rear shafts. These shafts 20, 21, and 22 are disposed in parallel side-by-side relation, and are selectively connectible for power transfer by a transmission T which comprises a front rotary or wheel member 35, a dual middle wheel member 36, and a rear wheel member 37 connected for simultaneous rotation. The wheel members, consisting specifically of a sprocket 35, a dual sprocket 36, and a sprocket 37, are respectively rotatable on the front, middle, and rear shafts 20, 21, and 22, and are adapted to be selectively connected to the shafts 20, 21, and 22 for power transfer by jaw clutches 38, 39 and 40 having operating means 41, 42 and 43 for engagement and disengagement of the respective clutches. The sprockets 35, 36, and 37 are connected for simultaneous rotation as a unit by means making peripheral engagement with the wheel members 35, 36 and 37, such means being shown as chains 44 and 45. For driving a first drivable mechanism, consisting of the pump A, a sheave 47 is rotatably mounted on the shaft 21 and a clutch 48 is provided for connecting the sheave 47 to the shaft 21 to enable the driving of the pump A through transmission means consisting of belts 49 which run over the sheave 47 and the power input sheave or pulley 50 of the pump A.

A second drivable mechanism, consisting of the pump B, may be driven from the rear shaft 22 through a transmission, comprising sheaves 51 and 52 over which belts 53 run. The sheave 51 is rotatably mounted on a jack shaft 54 and is adapted to be connected to this jack shaft 54 by a clutch 55. A chain 56 runs over sprockets 57 and 58 which are fixed on the shafts 22 and 54. When the clutch 40 is disengaged and clutches 18 and 55 are engaged, the rear engine 13 may be employed to drive pump B. If, at this time, clutches 16, 38, and 40 are engaged, the power of the front engine 11 may be added to the power of the rear engine 13 in the driving of the pump B. On the other hand, should there be a failure of the engine 13, the clutch 18 may be disengaged so that the pump B will be driven from the front engine 11 or even from the front engine 10, or both of these engines 10 and 11 in combination.

A conception of the extensive utility of the invention may be perceived from the following explanation. In accordance with the present invention, pumps A and B are of heavy duty type. That is to say, either of these pumps may be, when in good condition, employed to pump drilling mud at high pressure—for example, 2000 pounds p. s. i.—under which circumstances high power, for example, power from two engines, is employed. By engaging clutches 16, 17, 38 and 39, while the clutch 40 is disengaged, the front and middle engines 11 and 12 may be utilized to drive pump A with sufficient power to enable the use of pump A for circulating drilling mud through the drilling string and the well. At this time, the clutches 18 and 55 may be engaged so that the rear engine 13 may drive the pump B with low power, for the purpose of circulating drilling mud through the mud handling equipment situated adjacent the derrick. When the pump A becomes worn, it may be taken off of heavy duty service and pump B may be then employed for circulating drilling mud under relatively high pressure through the drilling string and the well. This is expediently accomplished by disengaging clutch 39 and engaging clutch 40 so that the overrunning transmission T will connect the shafts 20 and 22 and combine the power of the front engine 11 and the rear engine 13 in the driving of the pump B. The pump A, previously utilized for heavy duty service, may be now driven by the middle engine 12 through engaged clutches 17 and 48 for light duty service, for example, circulating mud through the mud handling or conditioning equipment adjacent the derrick. When clutch 30 is engaged, the shaft 19 will be connected to the shaft 20, and by the engagement of the clutch 38, the shaft 20 may be connected to the transmission T, thereby making it possible to carry power from the middle and rear engines 12 and 13 to the shaft 19 to supplement or replace power of the front engines 10 and 11 in driving a third drivable mechanism described as the drawworks 14.

I claim as my invention:

1. In means for selectively driving equipment of a derrick having a drawworks, the combination of: front, middle and rear engines; front, middle, and rear shaft elements in side by side relation; front, middle and rear clutches through which said shaft elements may be respectively driven by said engines; transmission means to connect said front shaft element to the drawworks; a dual wheel rotatable with relation to said middle shaft element; middle clutch means to connect said dual wheel to said middle shaft element; a front wheel rotatable with relation to said front shaft element; means connecting said front wheel to said front shaft element; a rear wheel rotatable with relation to said rear shaft element; rear clutch means for connecting said rear wheel to said rear shaft element; means connecting said wheels independently of said shaft elements for simultaneous rotation relative to said shaft elements; means connected to said middle shaft element independently of said dual wheel for driving a first mechanism from said middle shaft element; and means for driving a second mechanism from said rear shaft element.

2. In means for selectively driving equipment of a derrick having a drawworks, the combination of: front, middle and rear engines; front, middle, and rear shaft elements in side by side relation respectively driven by said engines; transmission means to connect said front shaft element to the drawworks; a dual wheel associated with said middle shaft element; middle clutch means to connect said dual wheel to said middle shaft element; a front wheel associated with said front shaft element and adapted to be driven thereby; a rear wheel associated with said rear shaft element; rear clutch means for connecting said rear wheel to said rear shaft element; means connecting said wheels for simultaneous rotation; means for driving a first mechanism from said middle shaft element independently of said dual wheel; means for driving a second mechanism from said rear shaft element; means for engaging said middle clutch means and disengaging said rear clutch means so that said front and middle engines may drive said first mechanism and said rear engine may drive said second mechanism; and means for engaging said rear clutch means and disengaging said middle clutch means so that said middle engine may drive said first mechanism and said front and rear engines may drive said second mechanism.

3. In means for selectively driving equipment of a derrick having a drawworks, the combination of: front, middle and rear engines; front, middle, and rear shaft elements in side by side relation respectively driven by said engines; transmission means to connect said front shaft element to the drawworks; a dual wheel associated with said middle shaft element; middle clutch means to connect said dual wheel to said middle shaft element; a front clutch means for connecting said front wheel to said front shaft element; a rear wheel associated with said rear shaft element; rear clutch means for connecting said rear wheel to said rear shaft element; means connecting said wheels for simultaneous rotation; means connectable to said middle shaft independently of said wheel for driving a first mechanism from said middle shaft element; means for driving a second mechanism from said rear shaft element; means for engaging said front clutch means; means for engaging said middle clutch means and disengaging said rear clutch means so that said front and middle engines may drive said first mechanism and said rear engine may drive said second mechanism; and means for engaging said rear clutch means and disengaging said middle clutch means so that said middle engine may drive said first mechanism and said front and rear engines may drive said second mechanism.

4. In means for selectively driving equipment of a derrick having a drawworks, the combination of: front, middle and rear engines; front, middle, and rear shaft elements in side by side relation respectively driven by said engines; transmission means to connect said front shaft element to the drawworks; a dual wheel associated with said middle shaft element; middle clutch means to connect said dual wheel to said middle shaft element; a front wheel associated with said front shaft element and adapted to be driven thereby; a rear wheel associated with said rear shaft element; rear clutch means for connecting said rear wheel to said rear shaft element; means connecting said wheels for simultaneous rotation; means connectable to said middle shaft independently of said wheel for driving a first mechanism from said middle shaft element; means for driving a second mechanism from said rear shaft element; means for engaging said middle clutch means and disengaging said rear clutch means so that said front and middle engines may drive said drawworks and/or said first mechanism and said rear engine may drive said second mechanism; and means for engaging said rear clutch means and disengaging said middle clutch means so that said middle engine may drive said first mechanism and said front and rear engines may drive said drawworks and/or said second mechanism.

5. In means for selectively driving equipment of a derrick having a drawworks, the combination of: front, middle and rear engines; front, middle, and rear shaft elements in side by side relation respectively driven by said engines; transmission means to connect said front shaft element to the drawworks; a dual wheel associated with said middle shaft element; middle clutch means to connect said dual wheel to said middle shaft element; a front clutch means for connecting said front wheel to said front shaft element; a rear wheel associated with said rear shaft element; rear clutch means for connecting said rear wheel to said rear shaft element; means connecting said wheels for simultaneous rotation; means connectable to said middle shaft independently of said wheel for driving a first mechanism from said middle shaft element; means for driving a second mechanism from said rear shaft element; means for engaging said front clutch means; means for engaging said middle clutch means and disengaging said rear clutch means so that said front and middle engines may drive said drawworks and/or said first mechanism and said rear engine may drive said second mechanism; and means for engaging said rear clutch means and disengaging said middle clutch means so that said middle engine may drive said first mechanism and said front and rear engines may drive said drawworks and/or said second mechanism.

6. In a selectively operable power means for driving first, second and third mechanisms, the combination of: front, middle and rear power sources; front, middle, and rear shaft elements in side by side relation; front, middle and rear clutches through which said shaft elements may be respectively driven by said power sources; a dual wheel rotatable with relation to said middle shaft element; middle clutch means to connect said dual wheel to said middle shaft element; a front wheel rotatable with relation to said front shaft element and adapted for driving connection therewith; a rear wheel rotatable with relation to said rear shaft element; rear clutch means for connecting said rear wheel to said rear shaft element; transmission means connecting said wheels for simultaneous rotation relative to said shaft elements; means operating independently of said transmission means for driving the first mechanism from said middle shaft element; means for driving the second mechanism from said rear shaft element; and means for driving the third mechanism from said front shaft.

7. In a selectively operable power means for driving first, second and third mechanisms, the combination of: front, middle and rear power sources; front, middle, and rear shaft elements in side by side relation respectively driven by said power sources; a dual wheel associated with said middle shaft element; middle clutch means to connect said dual wheel to said middle shaft element; a front clutch means for connecting said front wheel to said front shaft element; a rear wheel associated with said rear shaft element; rear clutch means for connecting said rear wheel to said rear shaft element; means peripherally connecting said wheels for simultaneous rotation; means connectable to said middle shaft independently of said wheel for driving the first mechanism from said middle shaft element; means for driving the second mechanism from said rear shaft element; means for driving the third mechanism from said front shaft; means for engaging said front clutch means; means for engaging said middle clutch means and disengaging said rear clutch means so that said front and middle power sources may drive said third mechanism and/or said first mechanism and said rear power source may drive said second mechanism; and means for engaging said rear clutch means and disengaging said middle clutch means so that said middle power source may drive said first mechanism and said front and rear power sources may drive said third mechanism and/or said second mechanism.

8. In a selective transmission for delivering power from a plurality of power sources to a plurality of driven mechanisms, the combination of: a plurality of shafts respectively driven by said power sources; a member freely rotatable on each of said shafts; transmission means interconnecting said members for unitary rotation independently of rotation of said shafts; means on each shaft operable to drivingly connect it to the member rotatable thereon; and means releasably connecting each of said shafts independently of said transmission means with a driven mechanism.

SAMUEL W. WEBSTER.

REFERENCES CITED

The following references are of record ni the file of this patent:

UNITED STATES PATENTS

| Number | Name | Date |
| --- | --- | --- |
| 2,171,994 | Riise | Sept. 5, 1939 |
| 2,243,156 | Howe et al. | May 27, 1941 |
| 2,246,478 | Guier | June 17, 1941 |
| 2,282,597 | Archer | May 12, 1942 |